(12) United States Patent
Qian et al.

(10) Patent No.: US 12,485,999 B2
(45) Date of Patent: Dec. 2, 2025

(54) HYDROFOIL CAVITATING FLOW CONTROL STRUCTURE

(71) Applicant: Wuhan University, Wuhan (CN)

(72) Inventors: Zhongdong Qian, Wuhan (CN); Shaofeng Zhang, Wuhan (CN); Longjian Xue, Wuhan (CN); Zhiwei Guo, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 645 days.

(21) Appl. No.: 17/943,165

(22) Filed: Sep. 12, 2022

(65) Prior Publication Data

US 2023/0084338 A1 Mar. 16, 2023

(30) Foreign Application Priority Data

Jul. 12, 2021 (CN) .......................... 202110784157.8

(51) Int. Cl.
*B63B 1/24* (2020.01)
*F03B 11/04* (2006.01)
(Continued)

(52) U.S. Cl.
CPC .............. *B63B 1/248* (2013.01); *F03B 11/04* (2013.01); *F04D 29/18* (2013.01); *F04D 29/669* (2013.01);
(Continued)

(58) Field of Classification Search
CPC .... B63B 1/248; B63H 1/18; B63H 2001/185; B63H 1/26; B63H 1/28; B64C 2003/148;
(Continued)

(56) References Cited

U.S. PATENT DOCUMENTS

| | | | | |
|---|---|---|---|---|
| 1,303,544 A | * | 5/1919 | Dorr | ....................... B64C 21/10 244/91 |
| 1,480,408 A | * | 1/1924 | Miller | ..................... B64C 21/10 244/200 |

(Continued)

FOREIGN PATENT DOCUMENTS

| CN | 109649641 A | * | 4/2019 |
|---|---|---|---|
| CN | 117366016 A | * | 1/2024 |

(Continued)

*Primary Examiner* — Ajay Vasudeva
(74) *Attorney, Agent, or Firm* — JCIP GLOBAL INC.

(57) ABSTRACT

A hydrofoil cavitating flow control structure includes a hydrofoil. A primary protuberant stripe is disposed in a middle position of a suction side of the hydrofoil, a plurality of symmetrically-distributed secondary protuberant stripes are disposed obliquely at both sides of the primary protuberant stripe, and the plurality of secondary protuberant stripes are uniformly and equidistantly distributed along the length direction of the primary protuberant stripe. By changing geometric parameters such as an included angle between the primary protuberant stripe and the second protuberant stripe, a ratio of cross section diameters and a distribution spacing of the second protuberant stripes along a chord length direction of the hydrofoil and the like, the shedding of cloud cavitation on a hydrofoil surface is effectively suppressed, and cavitation erosion and pressure pulsation generated by cavitation collapse is reduced, thus improving the operation efficiency and the service life of hydraulic machinery.

6 Claims, 6 Drawing Sheets

(51) Int. Cl.
*F04D 29/18* (2006.01)
*F04D 29/66* (2006.01)
*F15D 1/00* (2006.01)

(52) U.S. Cl.
CPC ............ *F15D 1/003* (2013.01); *F15D 1/0035* (2013.01); *Y02E 10/20* (2013.01)

(58) Field of Classification Search
CPC ..... B64C 21/02; B64C 21/10; B64C 2230/26; F03B 11/04; F04D 29/66; F04D 29/666; F04D 29/667; F04D 29/669; F15D 1/003; F15D 1/0035; F15D 1/004; F15D 1/0045
See application file for complete search history.

(56) References Cited

U.S. PATENT DOCUMENTS

| | | | | |
|---|---|---|---|---|
| 1,531,967 A | * | 3/1925 | Macmillan | B63H 1/20 416/236 R |
| 1,910,626 A | * | 5/1933 | Montgomery | B64C 21/10 244/198 |
| 1,994,045 A | * | 3/1935 | Nelson | B64C 21/10 244/200 |
| 4,869,644 A | * | 9/1989 | Takigawa | F04D 29/661 416/223 R |
| 4,907,765 A | * | 3/1990 | Hirschel | B64C 21/10 244/130 |
| 5,114,099 A | * | 5/1992 | Gao | B64C 21/10 244/130 |
| 8,460,779 B2 | * | 6/2013 | Gupta | F15D 1/004 428/167 |

FOREIGN PATENT DOCUMENTS

| | | | | |
|---|---|---|---|---|
| CN | 118025352 A | * | 5/2024 | |
| WO | WO-2008089790 A1 | * | 7/2008 | ............. B64C 21/10 |

\* cited by examiner

HYDROFOIL CAVITATING FLOW CONTROL STRUCTURE

CROSS-REFERENCE TO RELATED APPLICATIONS

Pursuant to 35 U.S.C. § 119 and the Paris Convention Treaty, this application claims foreign priority to Chinese Patent Application No. 202110784157.8 filed Jul. 12, 2021. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of cavitating flow control technologies, and more particularly to a hydrofoil cavitating flow control structure.

Cavitation is a complex phase change phenomenon, which usually appears when a local static pressure in a liquid is lower than a saturated vapor pressure, that has destructive effects on many industrial applications. The unsteady cloud cavitation draws much attention because it frequently appears in hydraulic machinery applications and has significant effect on performances such as vibration, noise and cavitation erosion. In addition, for those rotating hydraulic machinery such as water pumps, inducers and water turbines, the shedded cloud cavitation usually blocks a flow channel of an impeller, reducing the operation efficiency of the machine. Therefore, suppressing the cloud cavitation shedding is important for improving the operation efficiency and the service life of the hydraulic machinery. Compared with an active cavitating flow control structure, a passive control structure can be easily implemented in a full-scale equipment because no external energy supply is needed.

SUMMARY

To address the above problems, the disclosure proposes a hydrofoil cavitating flow control structure to suppress shedding of cloud cavitation, reduce cavitation erosion and pressure pulsation generated by cavitation collapse for the hydrofoil surface, and improve a hydrodynamic performance of a hydrofoil.

There is provided a hydrofoil cavitating flow control structure, comprising a hydrofoil. A primary protuberant stripe is disposed in a middle position of a suction side of the hydrofoil, a plurality of symmetrically-distributed secondary protuberant stripes are disposed obliquely at both sides of the primary protuberant stripe, and the plurality of secondary protuberant stripes are uniformly and equidistantly distributed along a length direction of the primary protuberant stripe.

In a class of this embodiment, the primary protuberant stripe is obtained from a protuberant part which is outside the hydrofoil and formed by scanning a circular cross-section of the primary protuberant stripe along a scan trajectory of the primary protuberant stripe, wherein the scan trajectory of the primary protuberant stripe is closely attached to the suction side of the hydrofoil, and a center of the circular cross-section of the primary protuberant stripe is located on the scan trajectory of the primary protuberant stripe; the secondary protuberant stripes is obtained from a protuberant part which is outside the hydrofoil and formed by scanning a circular cross-section of the secondary protuberant stripes along a scan trajectory of the secondary protuberant stripe, wherein the scan trajectory of the secondary protuberant stripes is closely attached to the suction side of the hydrofoil, and a center of the circular cross-section of the secondary protuberant stripes is located on the scan trajectory of the secondary protuberant stripe.

In a class of this embodiment, an included angle β between the primary protuberant stripe and the secondary protuberant stripes is 27° to 32°.

In a class of this embodiment, a ratio $D_1/D_2$ of a diameter $D_1$ of the circular cross-section of the primary protuberant stripe to a diameter $D_2$ of the circular cross-section of the second protuberant stripe is in a range of 2 to 4.

In a class of this embodiment, a distribution spacing S of the secondary protuberant stripes along a chord length direction of the hydrofoil is 0.04 C to 0.06 C, wherein C is a chord length of the hydrofoil.

In a class of this embodiment, a length $L_1$ of the primary protuberant stripe is 0.5 C to 0.9 C and a length $L_2$ of the secondary protuberant stripes is 0.4 C to 0.8 C, wherein C is the chord length of the hydrofoil.

In a class of this embodiment, the hydrofoil may be a rotary impeller blade or stationary impeller blade of hydraulic machinery.

Compared with prior arts, the disclosure has the following beneficial effects.

When a liquid flows from the hydrofoil leading edge to the trailing edge, the liquid speed increases, the local static pressure of the hydrofoil suction side decreases, and thus sheet cavitation may occur on the suction side. When the sheet cavitation grows to a certain length, a reentrant jet occurs in the tail of the sheet cavitation. When the reentrant jet moves to be near the hydrofoil leading edge, the sheet cavitation is cut off to form cloud cavitation, thus leading to dramatic pressure pulsation and cavitation erosion. In the disclosure, the primary protuberant stripe and the second protuberant stripes on the suction side of the hydrofoil can change a movement direction of the reentrant jet and weaken a momentum strength of the reentrant jet, thus effectively suppressing the shedding of the cloud cavitation, reducing pressure pulsation and cavitation erosion, and improving the operation efficiency and service life of the hydraulic machinery.

Numerals of the drawings are described as follows: 1. primary protuberant stripe, 2. secondary protuberant stripe, 3. hydrofoil, 4. hydrofoil leading edge, 5. hydrofoil trailing edge, 6. circular cross-section of the primary protuberant stripe, 7. scan trajectory of the primary protuberant stripe, 8.

circular cross-section of secondary protuberant stripe, 9. scan trajectory of secondary protuberant stripe.

DETAILED DESCRIPTION OF THE EMBODIMENTS

The technical solution and specific embodiments of the disclosure will be clearly and fully described in combination with accompanying drawings in the disclosure.

The disclosure comprises a primary protuberant stripe 1, secondary protuberant stripes 2, a hydrofoil 3, a hydrofoil leading edge 4, a hydrofoil trailing edge 5, a circular cross-section 6 of the primary protuberant stripe, a scan trajectory 7 of the primary protuberant stripe, a circular cross-section 8 of the secondary protuberant stripe, and a scan trajectory 9 of the secondary protuberant stripe. An embodiment of the disclosure provides a hydrofoil cavitating flow control structure, comprising the primary protuberant stripe 1 and the secondary protuberant stripes 2 distributed on a suction side of the hydrofoil 3.

Figure 1:
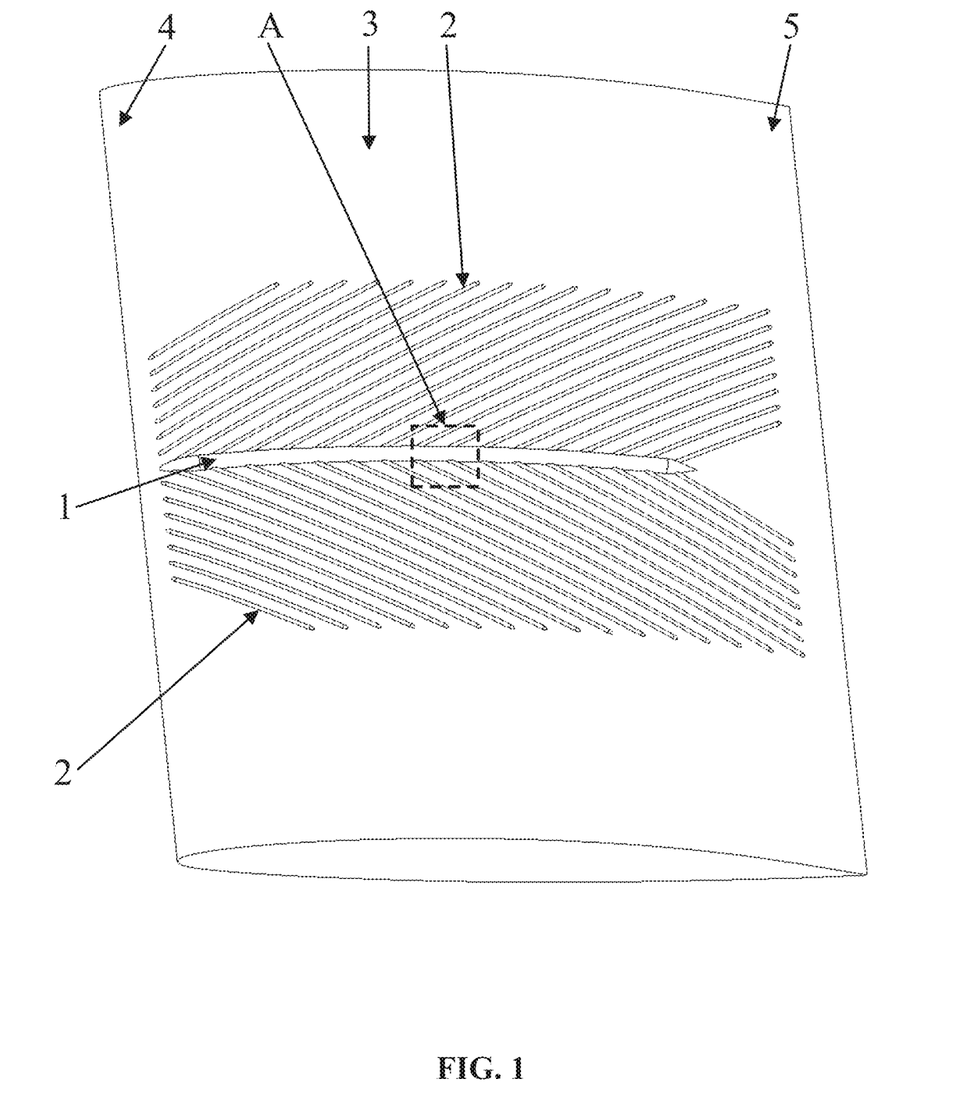
FIG. 1 is a structural schematic diagram of the disclosure.
Figure 2:
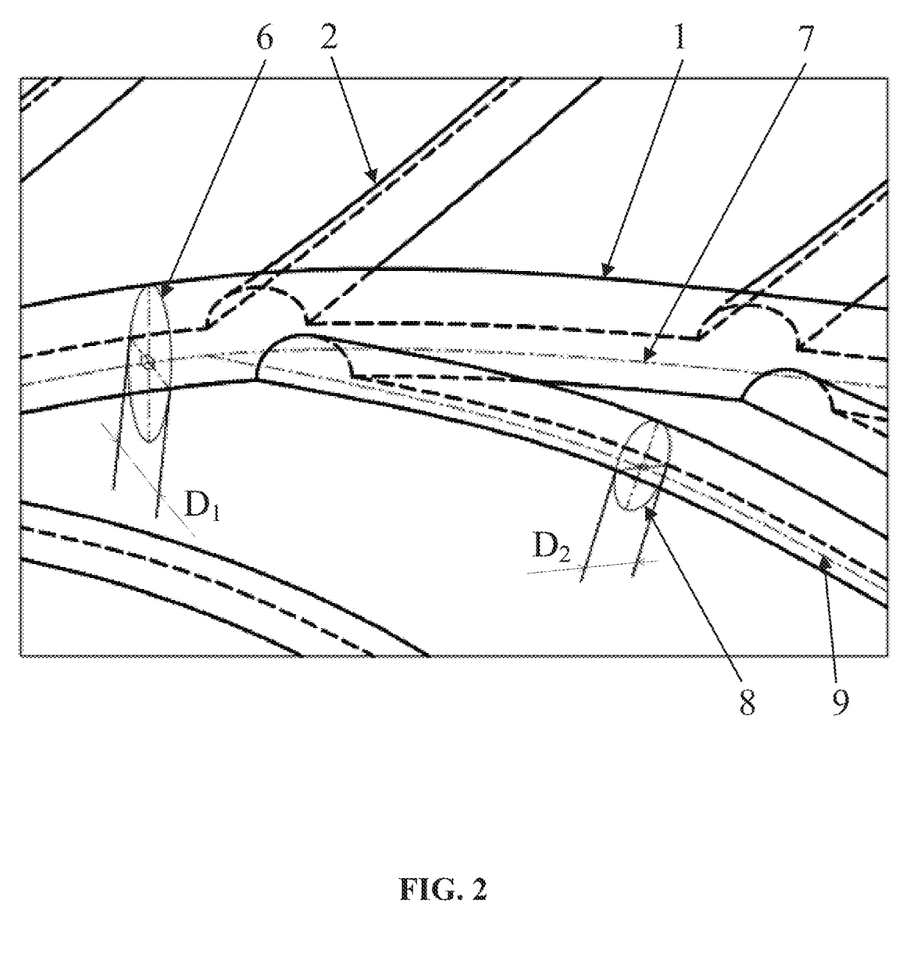
FIG. 2 is an enlarged structural schematic diagram of a part A in FIG. 1.

As shown in FIGS. 1 and 2, the scan trajectory 7 of the primary protuberant stripe is closely attached to a suction side of the hydrofoil 3, and a center of the circular cross-section 6 of the primary protuberant stripe is located on the scan trajectory 7 of the primary protuberant stripe. A protuberant part which is outside the hydrofoil 3 and formed by scanning the circular cross-section 6 of the primary protuberant stripe along the scan trajectory 7 of the primary protuberant stripe is the primary protuberant stripe 1. Likewise, the scan trajectory 9 of the secondary protuberant stripe is closely attached to the suction side of the hydrofoil 3, and a center of the circular cross-section 8 of the secondary protuberant stripe is located on the scan trajectory 9 of the secondary protuberant stripe. A protuberant part which is outside the hydrofoil 3 and formed by scanning the circular cross-section 8 of the secondary protuberant stripe along the scan trajectory 9 of the secondary protuberant stripe is the secondary protuberant stripe 2. In order to reduce a drag force generated by ends of the primary protuberant stripe 1 and the secondary protuberant stripe 2 for a fluid, passivated tips are adopted for the ends of the primary protuberant stripe 1 and the secondary protuberant stripe 2.

Figure 3:
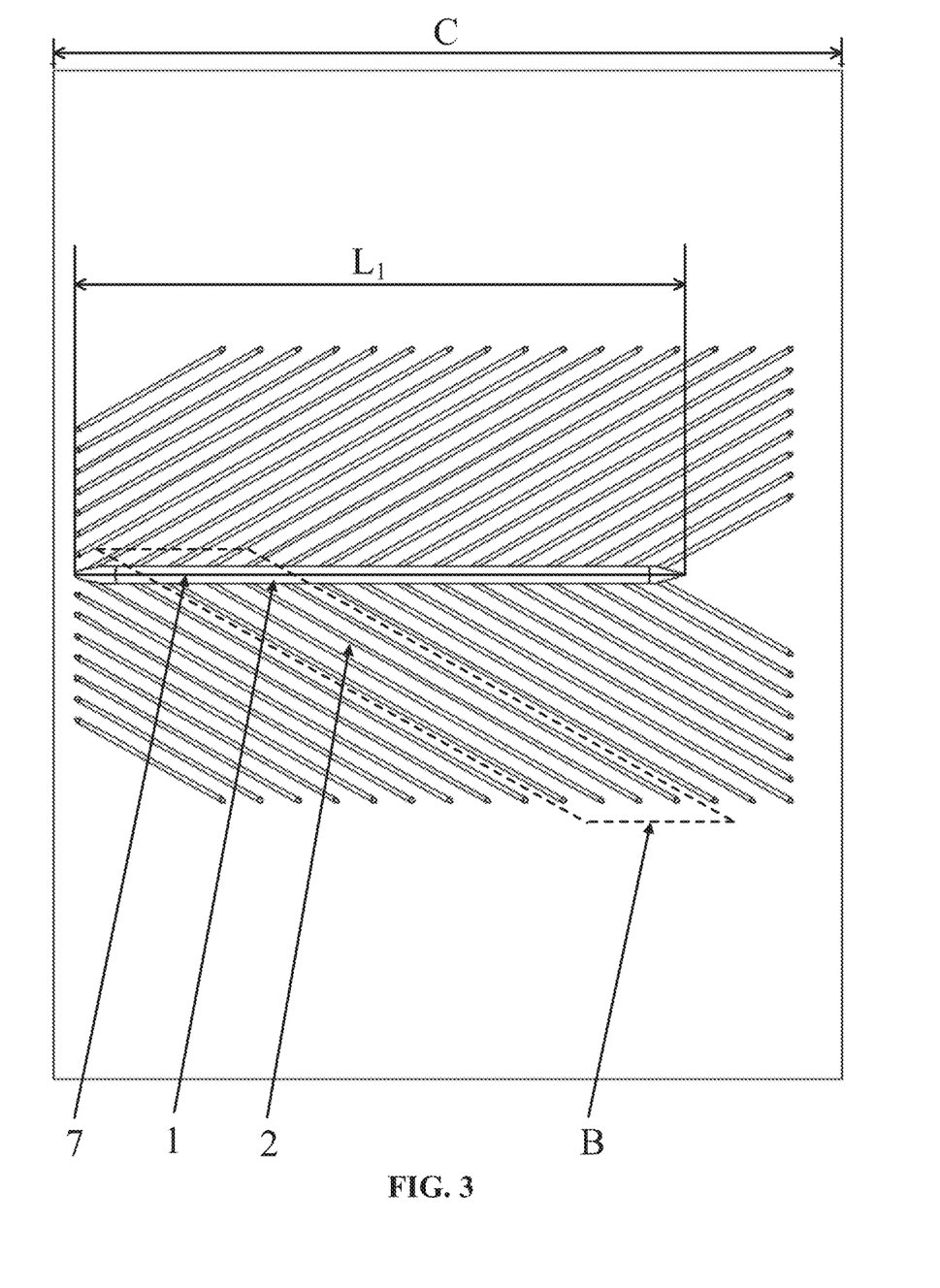
FIG. 3 is a top view of FIG. 1.
Figure 4:
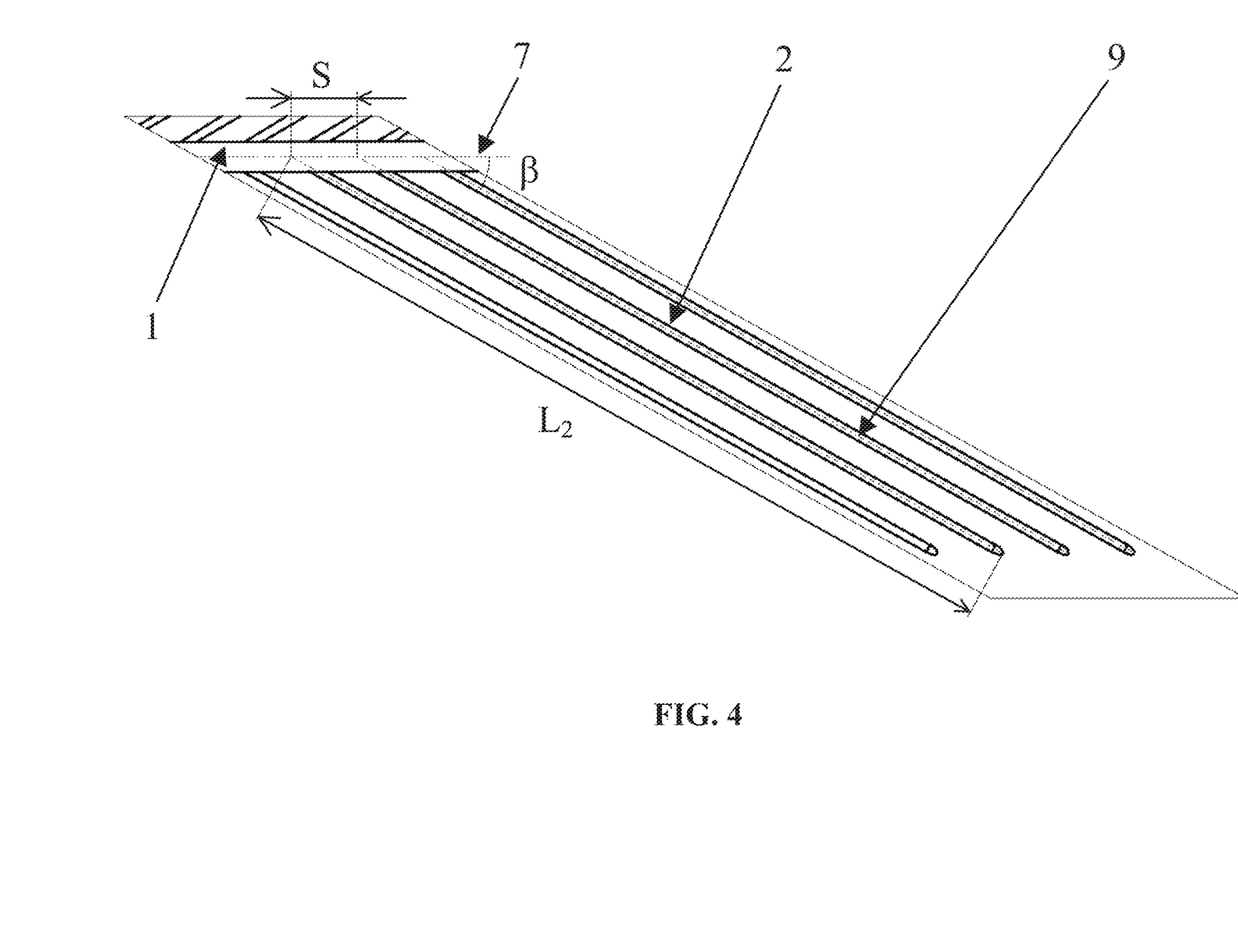
FIG. 4 is an enlarged structural schematic diagram of a part B in FIG. 3.

As shown in FIGS. 3 and 4, the secondary protuberant stripes 2 on both sides of the primary protuberant stripe 1 are arranged in a same spaced distribution manner, and the primary protuberant stripe 1 is located in a middle position of the suction side of the hydrofoil 3.

Embodiment 1

An included angle β between the primary protuberant stripe 1 and the secondary protuberant stripe 2 is 27°. The circular cross-section 6 of the primary protuberant stripe has a diameter $D_1$ of 2.8 mm and the circular cross-section 8 of secondary protuberant stripe has a diameter $D_2$ of 0.8 mm. A distribution spacing S of the secondary protuberant stripes 2 along a chord length direction of the hydrofoil 3 is 8 mm, where a chord length C of the hydrofoil 3 is 150 mm. A length $L_1$ of the primary protuberant stripe 1 is 116.2 mm and a length $L_2$ of the secondary protuberant stripe 2 is 89.2 mm.

Figure 5:
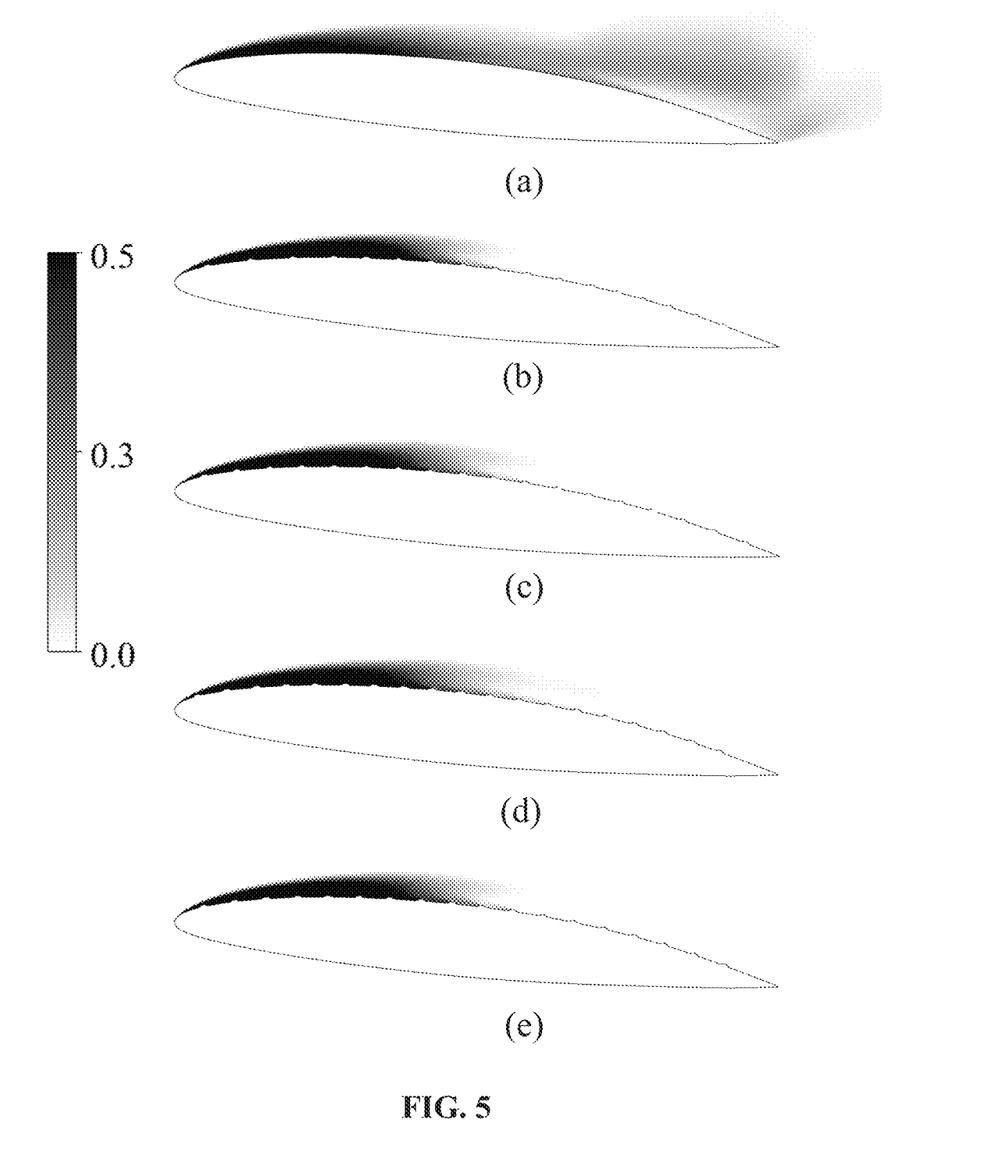
FIG. 5 is a comparison diagram of time-averaged cavitation circumstances with and without a hydrofoil cavitating flow control structure.
Figure 6:
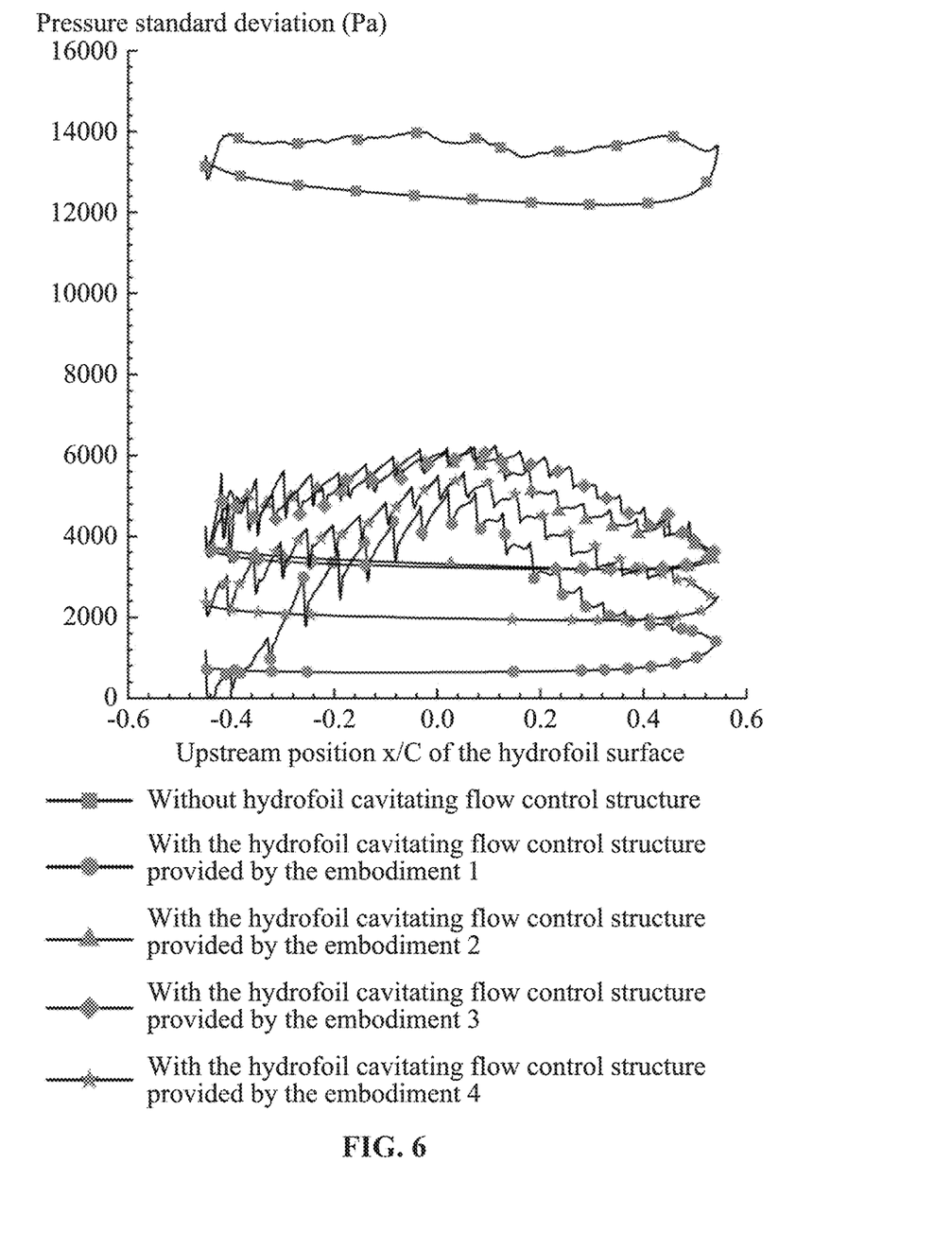
FIG. 6 shows comparison of pressure standard deviations at 20 mm from a midplane on a hydrofoil surface.

The feasibility of the disclosure is described by performing numerical simulation on the above specific embodiment. (a) of FIG. 5 shows time-averaged cavitation circumstance without a hydrofoil cavitating flow control structure provided by the specific embodiment and (b) of FIG. 5 shows time-averaged cavitation circumstance with a hydrofoil cavitating flow control structure provided by the specific embodiment. It can be seen from the comparison of (a) and (b) of FIG. 5 that the embodiment with the hydrofoil cavitating flow control structure can not only significantly suppress the shedding of cloud cavitation but also suppress the size of the cavitation. The numerical simulation results of the present embodiment show that, with the hydrofoil cavitating flow control structure provided by the disclosure, the time-averaged cavitation volume can be reduced to 47.53% of the original. FIG. 6 shows comparison of pressure standard deviations at 20 mm from a midplane on a hydrofoil surface. It can be found from the drawing that, with the cavitating flow control structure provided by the present embodiment, the pressure standard deviation of the hydrofoil surface is significantly reduced. That is, the mounting of the cavitating flow control structure provided by the present embodiment can reduce the pressure pulsation of the hydrofoil surface. Furthermore, a ratio of a lift coefficient to a drag coefficient of the hydrofoil (a lift-to-drag ratio) is an important parameter for determining the hydrodynamic properties of the hydrofoil. The numerical simulation results show that, with the hydrofoil cavitating flow control structure provided by the present embodiment, the lift-to-drag ratio of the hydrofoil can be increased by 57%, which indicates that the disclosure can improve the hydrodynamic properties of the hydrofoil while suppressing cavitation.

Embodiment 2

The included angle β between the primary protuberant stripe 1 and the secondary protuberant stripe 2 is 32°. The circular cross-section 6 of the primary protuberant stripe has a diameter $D_1$ of 1.9 mm and the circular cross-section 8 of secondary protuberant stripe has a diameter $D_2$ of 0.8 mm. The distribution spacing S of the secondary protuberant stripes 2 along the chord length direction of the hydrofoil 3 is 7.9 mm, where the chord length C of the hydrofoil 3 is 150 mm. The length $L_1$ of the primary protuberant stripe 1 is 116.2 mm and the length $L_2$ of the secondary protuberant stripe 2 is 89.2 mm.

The feasibility of the disclosure is described by performing numerical simulation on the above specific embodiment. (a) of FIG. 5 shows time-averaged cavitation circumstance without a hydrofoil cavitating flow control structure provided by the specific embodiment and (c) of FIG. 5 shows time-averaged cavitation circumstance with a hydrofoil cavitating flow control structure provided by the specific embodiment. It can be seen from the comparison of (a) and (c) of FIG. 5 that the embodiment with the hydrofoil cavitating flow control structure can not only significantly suppress the shedding of cloud cavitation but also suppress the size of the cavitation. The numerical simulation results of the present embodiment show that, with the hydrofoil cavitating flow control structure provided by the disclosure, the time-averaged cavitation volume can be reduced to 45.28% of the original. FIG. 6 shows comparison of pressure standard deviations at 20 mm from a midplane on a hydrofoil surface. It can be found from the drawing that, with the cavitating flow control structure provided by the present embodiment, the pressure standard deviation of the hydrofoil surface is significantly reduced. That is, the mounting of the cavitating flow control structure provided by the present embodiment can reduce the pressure pulsation of the hydrofoil surface. Furthermore, the numerical simulation results show that, with the cavitating flow control structure provided by the present embodiment, the lift-to-drag ratio of the hydrofoil can be increased by 38.73%, which indicates that the disclosure can improve the hydrodynamic properties of the hydrofoil while suppressing cavitation.

Embodiment 3

The included angle β between the primary protuberant stripe 1 and the secondary protuberant stripe 2 is 29°. The circular cross-section 6 of the primary protuberant stripe has a diameter $D_1$ of 3.5 mm and the circular cross-section 8 of secondary protuberant stripe has a diameter $D_2$ of 0.9 mm. The distribution spacing S of the secondary protuberant stripes 2 along the chord length direction of the hydrofoil 3 is 7.2 mm, where the chord length C of the hydrofoil 3 is 150 mm. The length $L_1$ of the primary protuberant stripe 1 is 116.2 mm and the length $L_2$ of the secondary protuberant stripe 2 is 89.2 mm.

The feasibility of the disclosure is described by performing numerical simulation on the above specific embodiment. (a) of FIG. 5 shows time-averaged cavitation circumstance without a hydrofoil cavitating flow control structure provided by the specific embodiment and (d) of FIG. 5 shows time-averaged cavitation circumstance with a hydrofoil cavitating flow control structure provided by the specific embodiment. It can be seen from the comparison of (a) and (d) of FIG. 5 that the embodiment with the hydrofoil cavitating flow control structure can not only significantly suppress the shedding of cloud cavitation but also suppress the size of the cavitation. The numerical simulation results of the present embodiment show that, with the hydrofoil cavitating flow control structure provided by the disclosure, the time-averaged cavitation volume can be reduced to 50.43% of the original. FIG. 6 shows comparison of pressure standard deviations at 20 mm from a midplane on a hydrofoil surface. It can be found from the drawing that, with the cavitating flow control structure provided by the present embodiment, the pressure standard deviation of the hydrofoil surface is significantly reduced. That is, the mounting of the cavitating flow control structure provided by the present embodiment can reduce the pressure pulsation of the hydrofoil surface. Furthermore, the numerical simulation results show that, with the cavitating flow control structure provided by the present embodiment, the lift-to-drag ratio of the hydrofoil can be increased by 33.4%, which indicates that the disclosure can improve the hydrodynamic properties of the hydrofoil while suppressing cavitation.

Embodiment 4

The included angle β between the primary protuberant stripe 1 and the secondary protuberant stripe 2 is 32°. The circular cross-section 6 of the primary protuberant stripe has a diameter $D_1$ of 3.0 mm and the circular cross-section 8 of secondary protuberant stripe has a diameter $D_2$ of 0.9 mm. The distribution spacing S of the secondary protuberant stripes 2 along the chord length direction of the hydrofoil 3 is 7.6 mm, where the chord length C of the hydrofoil 3 is 150 mm. The length $L_1$ of the primary protuberant stripe 1 is 116.2 mm and the length $L_2$ of the secondary protuberant stripe 2 is 89.2 mm.

The feasibility of the disclosure is described by performing numerical simulation on the above specific embodiment. (a) of FIG. 5 shows time-averaged cavitation circumstance without a hydrofoil cavitating flow control structure provided by the specific embodiment and (e) of FIG. 5 shows time-averaged cavitation circumstance with a hydrofoil cavitating flow control structure provided by the specific embodiment. It can be seen from the comparison of (a) and (e) of FIG. 5 that the embodiment with the hydrofoil cavitating flow control structure can not only significantly suppress the shedding of cloud cavitation but also suppress the size of the cavitation. The numerical simulation results of the present embodiment show that, with the hydrofoil cavitating flow control structure provided by the disclosure, the time-averaged cavitation volume can be reduced to 47.21% of the original. FIG. 6 shows comparison of pressure standard deviations at 20 mm from a midplane on a hydrofoil surface. It can be found from the drawing that, with the cavitating flow control structure provided by the present embodiment, the pressure standard deviation of the hydrofoil surface is significantly reduced. That is, the mounting of the cavitating flow control structure provided by the present embodiment can reduce the pressure pulsation of the hydrofoil surface. Furthermore, the numerical simulation results show that, with the hydrofoil cavitating flow control structure provided by the present embodiment, the lift-to-drag ratio of the hydrofoil can be increased by 45.71%, which indicates that the disclosure can improve the hydrodynamic properties of the hydrofoil while suppressing cavitation.

The above embodiments are used only to illustrate and describe the disclosure and not intended to limit the disclosure to the scope of the described embodiments. Those skilled in the art can understand that the disclosure is not limited to the above embodiments and more variations and changes can be made under the teaching of the disclosure. These variations and changes shall all fall within the scope of protection of the disclosure.

What is claimed is:

1. A hydrofoil cavitating flow control structure, comprising a hydrofoil, wherein a primary protuberant stripe is disposed in a middle position of a suction side of the hydrofoil, a plurality of symmetrically-distributed secondary protuberant stripes are disposed obliquely at both sides of the primary protuberant stripe, and the plurality of secondary protuberant stripes are uniformly and equidistantly distributed along a length direction of the primary protuberant stripe; the primary protuberant stripe is obtained from a protuberant part which is outside the hydrofoil and has a circular cross-section along an entire length of the primary protuberant stripe; a trajectory of the primary protuberant stripe is closely attached to the suction side of the hydrofoil, and a center of the circular cross-section of the primary protuberant stripe is located on the trajectory of the primary protuberant stripe; the secondary protuberant stripes are obtained from a protuberant part which is outside the hydrofoil and has a circular cross-section along an entire length of the secondary protuberant stripe; a trajectory of the secondary protuberant stripes is closely attached to the suction side of the hydrofoil, and a center of the circular cross-section of the secondary protuberant stripes is located on the trajectory of the secondary protuberant stripe.

2. The hydrofoil cavitating flow control structure of claim 1, wherein an included angle β between the primary protuberant stripe and the secondary protuberant stripes is 27° to 32°.

3. The hydrofoil cavitating flow control structure of claim 1, wherein a ratio $D_1/D_2$ of a diameter $D_1$ of the circular cross-section of the primary protuberant stripe to a diameter $D_2$ of the circular cross-section of the secondary protuberant stripes is in a range of 2 to 4.

4. The hydrofoil cavitating flow control structure of claim 1, wherein a distribution spacing S of the secondary protuberant stripes along a chord length direction of the hydrofoil is 0.04 C to 0.06 C, and C is a chord length of the hydrofoil.

5. The hydrofoil cavitating flow control structure of claim 1, wherein the entire length $L_1$ of the primary protuberant stripe is 0.5 C to 0.9 C and the entire length $L_2$ of the secondary protuberant stripes is 0.4 C to 0.8 C, and C is a chord length of the hydrofoil.

6. The hydrofoil cavitating flow control structure of claim 1, wherein the hydrofoil is a rotary impeller blade or stationary impeller blade of hydraulic machinery.

* * * * *